No. 716,544. Patented Dec. 23, 1902.
G. HOEPNER.
WEIGHING SCALE.
(Application filed June 13, 1901.)

(No Model.) 2 Sheets—Sheet 1.

Witnesses. Inventor.
F. Monteverde. George Hoepner
G. W. Burt. by Spear Seely
 Attys

THE NORRIS PETERS CO., PHOTO-LITHO., WASHINGTON, D. C.

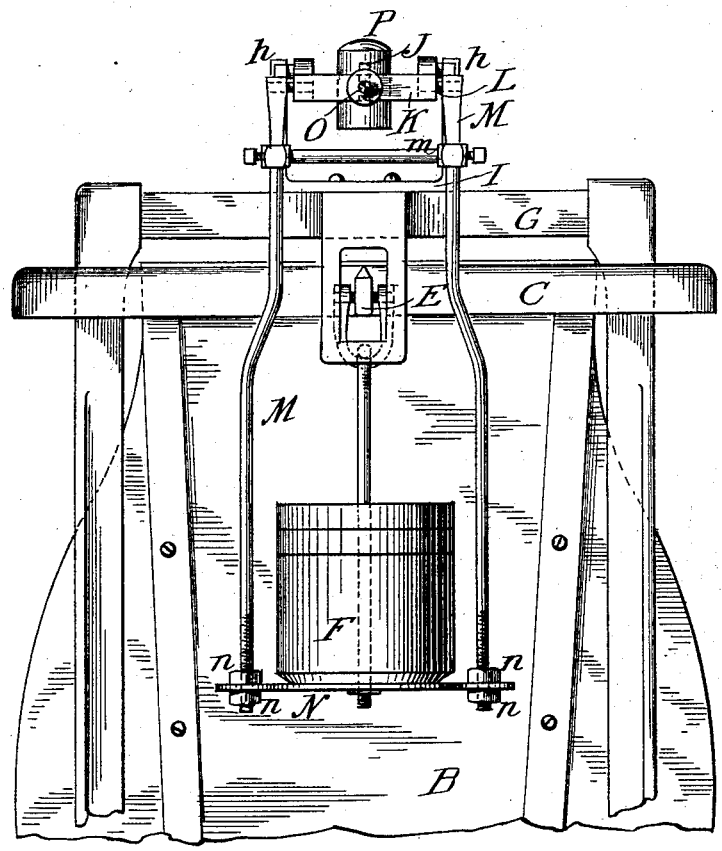

UNITED STATES PATENT OFFICE.

GEORGE HOEPNER, OF SAN FRANCISCO, CALIFORNIA, ASSIGNOR TO UNION SCALE AND MANUFACTURING COMPANY, OF SAN FRANCISCO, CALIFORNIA, A CORPORATION OF CALIFORNIA.

WEIGHING-SCALE.

SPECIFICATION forming part of Letters Patent No. 716,544, dated December 23, 1902.

Application filed June 13, 1901. Serial No. 64,456. (No model.)

*To all whom it may concern:*

Be it known that I, GEORGE HOEPNER, a citizen of the United States, residing at San Francisco, in the county of San Francisco and State of California, have invented certain new and useful Improvements in Weighing-Scales, of which the following is a specification.

My invention relates to weighing-scales. It is particularly adapted to be used as an attachment to automatic weighing-machines, although its use is not confined to that class of apparatus.

When the main scale-beam of an automatic weighing-machine has a pea calculated or adjusted to counterbalance a certain weight of material, no quantity less than such determined quantity can actuate the scale-beam or operate any other mechanism, such as a discharging gate or valve. The accuracy of the weighing devices depends upon this being the case. Therefore after stopping the machine—for instance, to run another kind of material through it—an unweighed residue usually remains in the weighing device, which might be only slightly less than the determined quantity referred to. This can be discharged to clear out the machine; but it is not weighed, and hence may remain unaccounted for.

An object of my invention is to weigh this residue accurately and speedily.

Other objects and purposes of my invention will be more fully hereinafter set forth, and the entire invention is fully hereinafter described.

I have selected an automatic weighing-machine as the basis for an embodiment of my invention, and in the accompanying drawings I have illustrated such parts of such a machine as are required for an understanding of my device.

Figure 1:
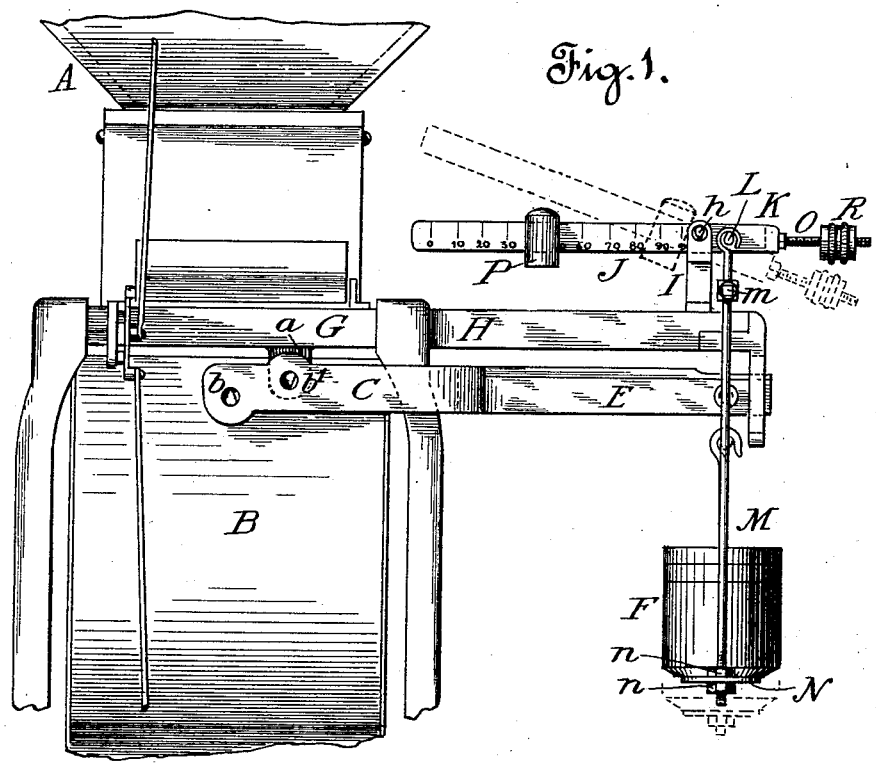
Figure 2:
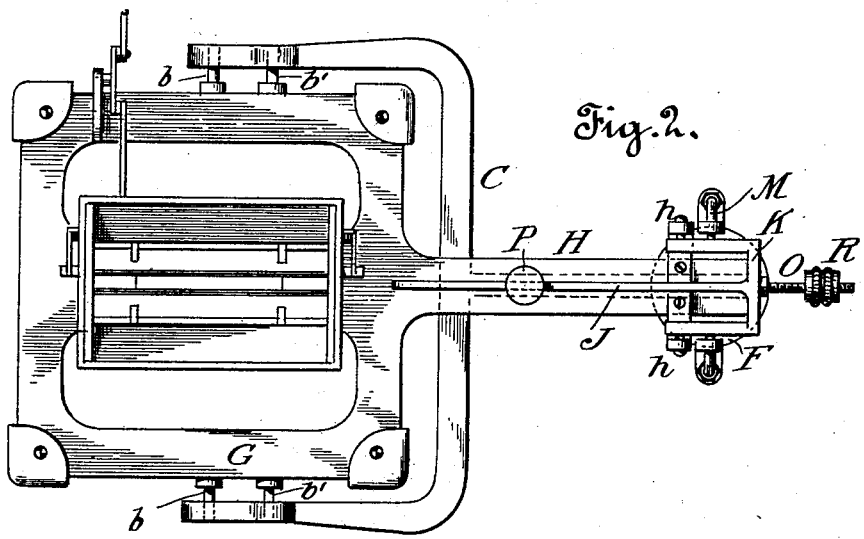
Figure 3:
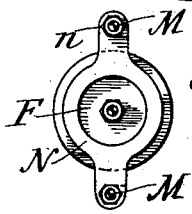

In the drawings, Figure 1 is a side elevation of part of an automatic weighing mechanism, the main scale-beam, and the devices which illustrate my invention. Fig. 2 is a plan view. Fig. 3 is a bottom plan of the plate suspended from the auxiliary scale-beam. Fig. 4 is a front elevation of the parts illustrated in Figs. 1 and 2.

A brief reference to the construction of the automatic weighing-machine which has been selected as a favorable illustration of the operation and advantages of my invention will be sufficient as preliminary to the description of the invention itself.

The material to be weighed—such as grain, coffee, sugar, flour, cereals, &c.—is discharged from the hopper A into the weighing-bucket B. This bucket is supported so as to be capable of limited vertical movement. Pivoted to both sides of the bucket and in the lug *a* of the machine-frame and on knife-edges *b b'* is a yoke C, carrying the main scale-beam E, from the free end of which is suspended the pea F. The weight of this pea is calculated with respect to the leverage of the scale-beam and the quantity to be automatically weighed in the bucket and delivered from it—that is, for example, a pea weighing ten pounds might counterbalance one hundred pounds of grain or other material in the bucket. When the quantity has been delivered to the bucket, it descends, and its descent actuates suitable mechanism which opens a valve or gate in its bottom and permits the discharge of the said one hundred pounds of material. This operation proceeds automatically and continuously as long as material is supplied to the hopper A. When the machine has been stopped or previous to weighing and delivering another material, there is usually an unweighed residue of less than one hundred pounds left in the weighing-bucket. In the supposed instance this might be any quantity insufficient to balance the scale-beam between one pound and one hundred pounds, and there is no convenient way of accurately determining the amount. If the pea F were sectional, an approximate result could be reached by removing sections until the bucket discharged and then making a calculation; but if the weight of any section counterbalances ten times by weight in the bucket it is clear that any result reached will be far from accurate, since the discharge, except by improbable accident, will always be in excess of what the pea indicates. This is sufficient to render such a method impracticable, even if the inconvenience, difficulty, and waste of time be ignored. The attachment illustrated in the drawings will determine the weight of the residue accurately and immediately and without calculation.

Secured to the supporting structure of the weighing-machine is a frame G, having a projecting arm H, which extends outwardly above the main scale-beam. A bracket I is secured to the arm H, having holes to receive the knife-edged pivots $h$ of the auxiliary scale-beam J. This beam forms part of a frame K in order to secure a wide bearing by spacing the pivots $h$ some distance apart. Near the pivotal points of the frame K are other knife-edged bearings L, from which are suspended the hangers M M, the latter being held together and on their supporting-bearings by a tie-rod $m$. Their lower ends are threaded, so that the open plate N can be adjustably secured by nuts, as $n$. This plate lies directly beneath the pea F of the main scale-beam and is open to permit the hanger of that pea to pass through when the plate and pea are in contact, Fig. 4. The auxiliary beam is graduated in any suitable way to represent ounces, pounds, or other standards of measurement, according to the size and capacity of the weighing-machine, and is provided with an adjustable pea P. The weight of the latter exerted through the leverage afforded by the auxiliary beam is in the same ratio as the weight of the main pea. A threaded rod O extends from the beam J and carries an adjustable counterweight R, which is used to overbalance the pea P at the neutral point—viz., at the graduation nearest the pivot. In the normal operation of the weighing-machine the pea P is at the said neutral point and is overbalanced to the dotted position of Fig. 1, lowering the plate N to the dotted position in the same figure. This whole auxiliary device is now out of action and remains so until intentionally brought into effective position, as will now be explained. Supposing, as before, that the weighing-bucket automatically weighs and delivers one hundred pounds of material and that the auxiliary beam is graduated to one hundred pounds, as shown, then the one-hundred graduation is the neutral point referred to. After stopping the weighing-machine the unweighed residue is determined by simply sliding the pea P out upon the auxiliary beam until the main scale-beam balances and the bucket discharges, leaving the quantity discharged indicated upon the auxiliary beam. As the pea is moved from the neutral point the plate N first comes into contact and then commences to exert a lifting pressure upon the main pea, and this lifting action increases directly as the auxiliary pea is moved. The effect is, practically, to reduce the weight of the pea F by the amount of upward pressure exerted beneath it. It is preferable to have the auxiliary beam record the actual weight of the residue on a single scale, as it does in the drawings, since there is less liability of error in taking off amounts and no subtraction is required. According to the drawings there are, say, thirty-five pounds left in the weighing-bucket, and the pea has consequently been moved a distance equivalent to a reduction in the weight of the main pea of 6.5 pounds, equaling sixty-five pounds in the weighing-bucket. This leaves the main pea weighing 3.5 pounds, and hence the thirty-five pounds in the bucket can operate the main scale-beam and discharge itself, leaving a record of its weight on the auxiliary beam.

The use of the auxiliary scale-beam and its pea is not limited to an automatic weighing-machine. For instance, it can be used in testing the weight of peas and also various weights, so as to determine their accuracy for platform-scales and all other kinds of weighing-machines. Taking a platform-scale, for instance, if a standard known weight be placed upon the platform and an unfinished heavy pea be hung on the scale-beam it is easy to ascertain exactly how much must be taken off the pea to bring it to its proper weight and ratio by employing my auxiliary scale-beam and reducing the weight of the pea in the manner previously described until the scale-beam balances, the auxiliary scale indicating the excess.

I do not limit myself to details of construction herein described, and shown in the drawings, as I desire to avail myself of such modifications and equivalents as fall properly within the spirit of my invention.

Having thus fully described my invention, what I claim as new, and desire to secure by Letters Patent, is—

1. In combination with a weighing-machine, and with its scale-beam and pea, a frame secured to a fixed part of the machine, an auxiliary scale-beam pivoted in said frame, hangers suspended from said auxiliary scale-beam, and a plate carried by and adjustable upon said hangers beneath the main pea of the weighing-machine.

2. In combination with a weighing-machine, and with its scale-beam and pea, a frame secured to a fixed part of the machine, an auxiliary scale-beam pivoted in said frame, an adjustable pea and an adjustable counterweight mounted upon the auxiliary beam on opposite sides of its pivotal point, hangers suspended from said auxiliary scale-beam, and a plate carried by said hangers beneath the main pea of the weighing-machine.

In testimony whereof I have affixed my signature, in presence of two witnesses, this 30th day of April, 1901.

GEORGE HOEPNER.

Witnesses:
PERCY J. DE LASAUX,
L. W. SEELY.